Sept. 6, 1955 R. C. MATLACK ET AL 2,717,279

MULTIPARTY SELECTIVE SIGNALING AND IDENTIFICATION SYSTEM

Filed Dec. 28, 1951 4 Sheets-Sheet 1

INVENTORS R. C. MATLACK
F. W. METZGER
BY
R. O. Covell
ATTORNEY

MULTIPARTY SELECTIVE SIGNALING AND IDENTIFICATION SYSTEM

Filed Dec. 28, 1951 4 Sheets-Sheet 2

INVENTORS R. C. MATLACK
F. W. METZGER
BY
R. O. Covell
ATTORNEY

MULTIPARTY SELECTIVE SIGNALING AND IDENTIFICATION SYSTEM

Filed Dec. 28, 1951 4 Sheets-Sheet 3

INVENTORS R. C. MATLACK
F. W. METZGER
BY R. O. Covell
ATTORNEY

MULTIPARTY SELECTIVE SIGNALING AND IDENTIFICATION SYSTEM

Filed Dec. 28, 1951 4 Sheets-Sheet 4

INVENTORS R.C. MATLACK
F.W. METZGER
BY R.O. Covell
ATTORNEY 2,717,279
Patented Sept. 6, 1955

2,717,279

MULTIPARTY SELECTIVE SIGNALING AND IDENTIFICATION SYSTEM

Richard C. Matlack, Summit, and Frederick W. Metzger, Rutherford, N. J., assignors to Bell Telephone Laboratories, Incorporated, New York, N. Y., a corporation of New York Application December 28, 1951, Serial No. 263,742
7 Claims. (Cl. 179—17)

This invention relates to improvements in switching systems and more particularly to improved means for station signaling and station identification in an automatic telephone switching system of the step-by-step type.

With the expansion of automatic telephone systems to serve larger areas and to provide means for subscriber dialing of toll calls to adjacent areas through the advent of automatic message accounting or automatic ticketing arrangements, it has become imperative that accurate and reliable means be provided for identifying subscribers who originate toll calls in order that the charges may be properly billed. In addition to the necessity for positive identification of single subscribers on separate lines, it is also desirable to be able automatically to identify individual subscribers on multiparty lines. Various means have been employed in the past for identifying either of two parties on a common metallic line. These means generally require a ground return path which frequently is a source of undesirable noise and other interference in the telephone talking circuit. With such systems of the prior art it has not generally been possible to identify more than four subscribers on a common line without the intervention of an operator. To overcome these problems the present invention has been made.

One of the objects of the invention is to provide means for automatically and positively identifying any party station originating a call on a party line serving an unlimited number of subscribers.

Another object of the invention is to provide improved means for automatic signaling of any individual party on a multiparty line serving any needfully large and, from a practical standpoint, unlimited number of subscribers.

Another object is the more effective utilization of apparatus by employing one and the same means at subscribers' stations for selectively ringing party line subscribers and identifying them when they make calls.

A further object of the invention is to provide positive identification of any subscriber originating a call, whether over a separate line or a party line, without resort to marginal means or a plurality of differentiating tests as have heretofore been required.

The purpose of the invention is to secure these objects more effectively and reliably without impairing the quality of the talking circuit, and with greater economy of apparatus than has heretofore been possible.

The general manner in which these objects are attained is by the use of tuned vibrating reed selector devices installed at the telephone subscribers' stations in combination with a plurality of similarly tuned reed selectors installed at the automatic telephone switching office.

Figure 1:
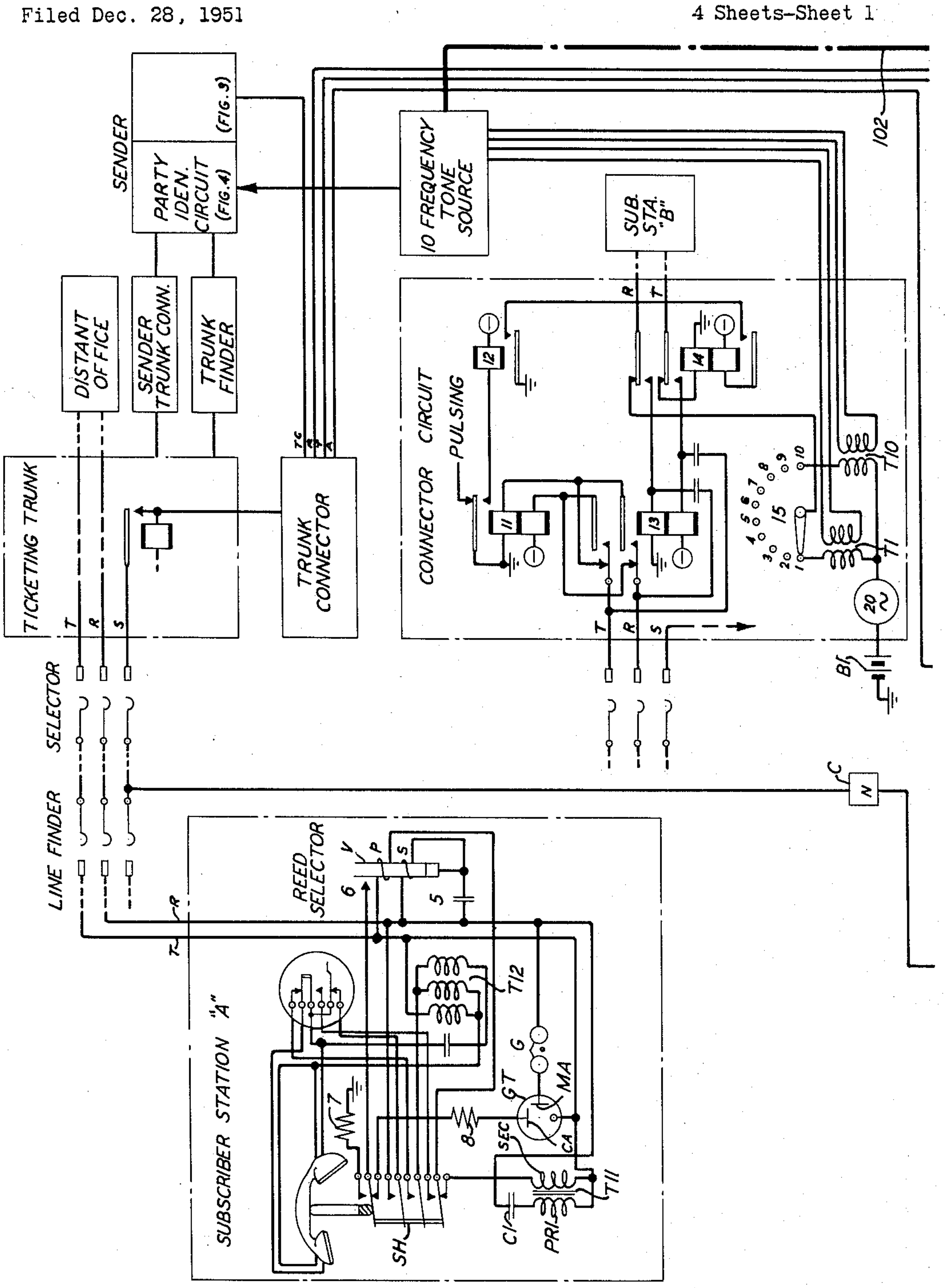
Figure 2:
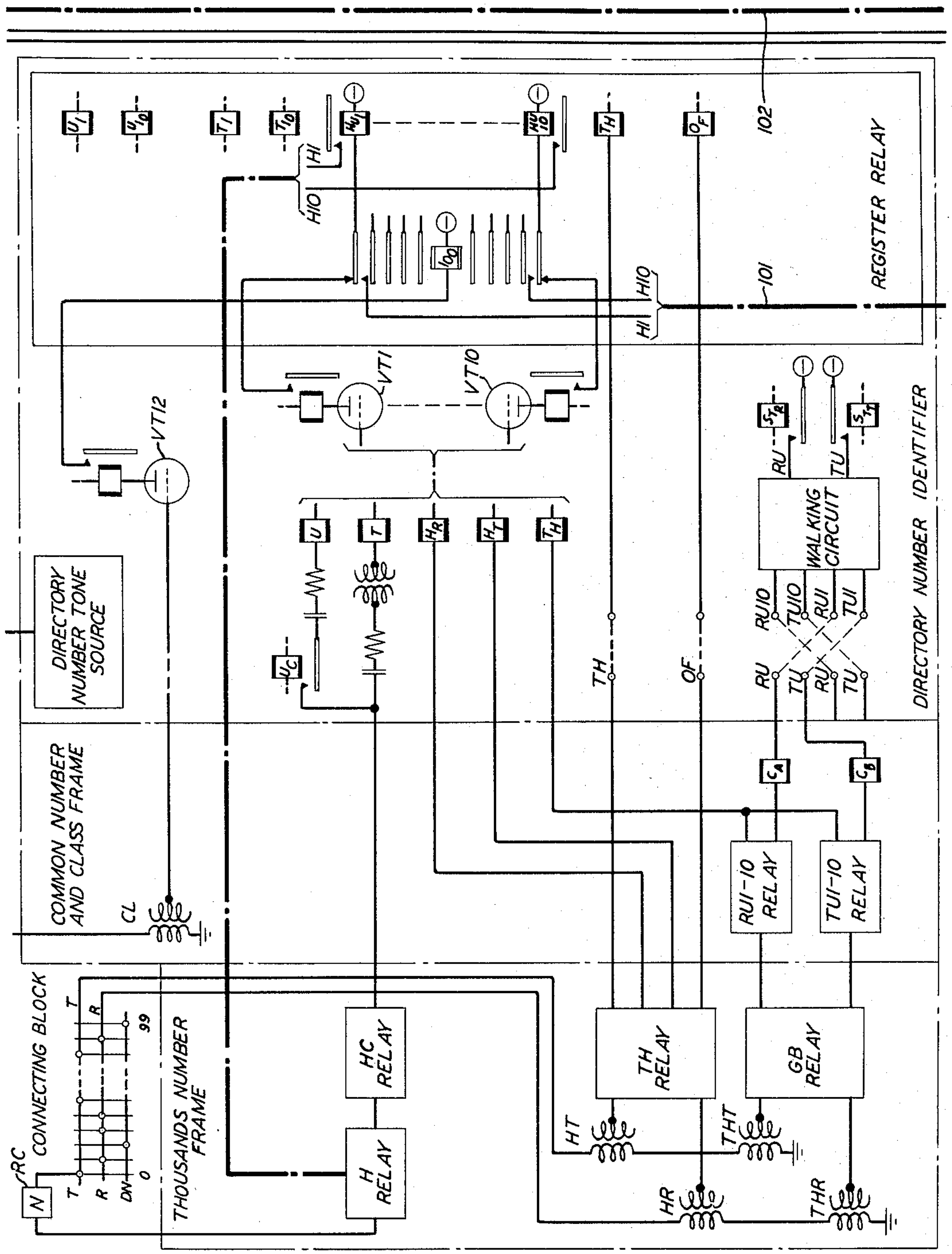
Figure 3:
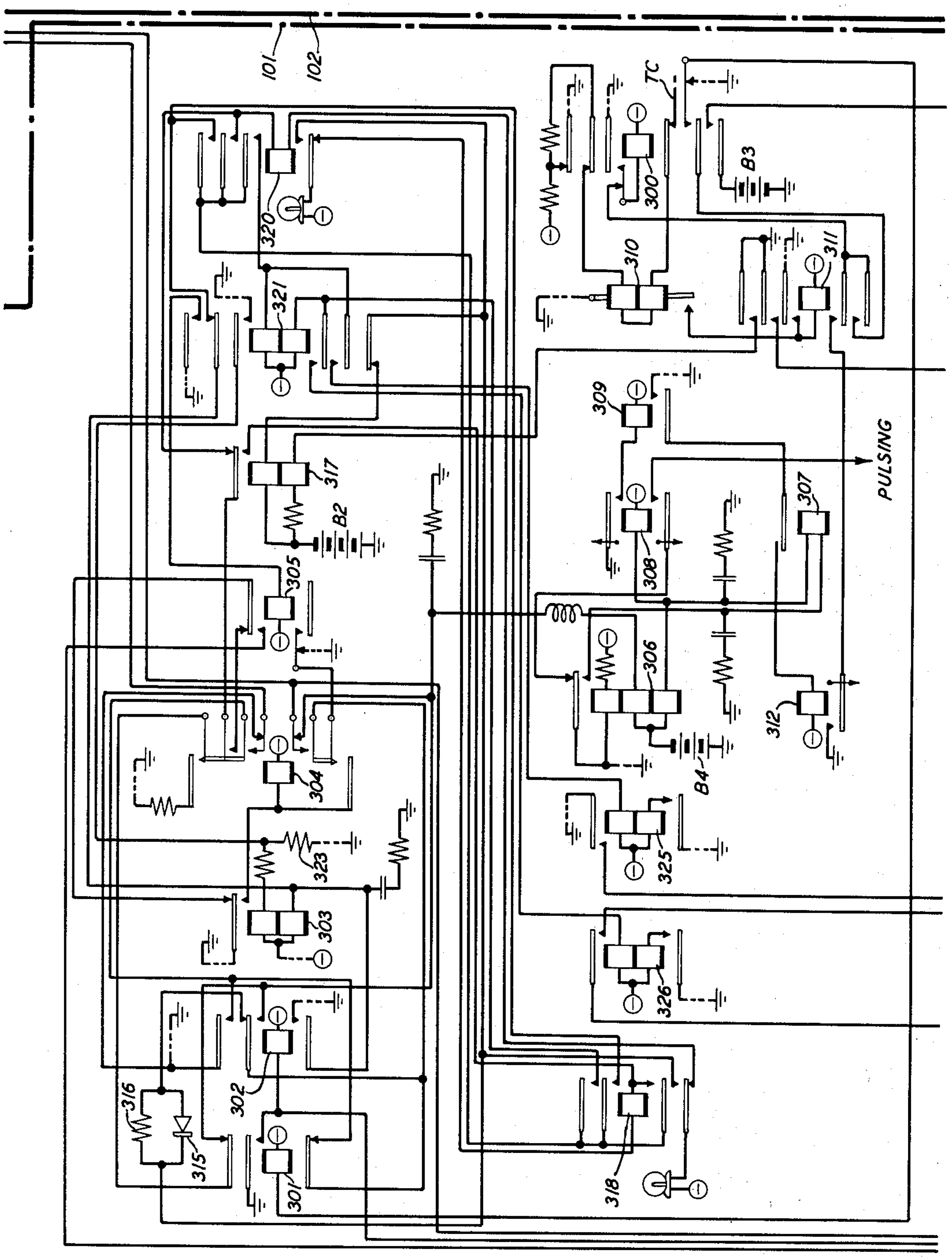
Figure 4:
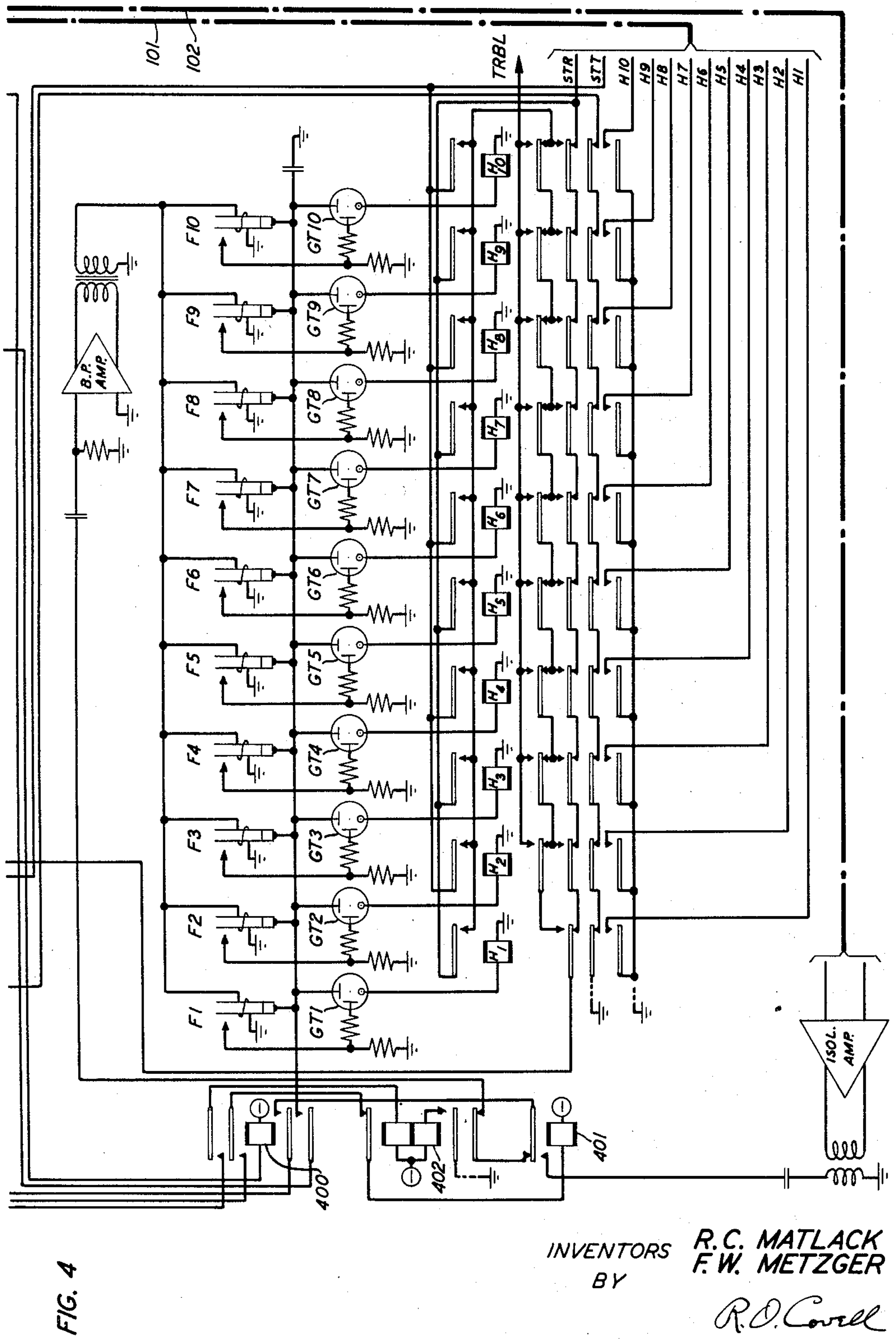

Details of a preferred embodiment of the invention are disclosed by the accompanying drawing in which:

Fig. 1 and Fig. 2 represent schematically the circuit of a step-by-step telephone office equipped for automatic ticketing with provision for ten-party service; and Figs. 3 and 4 taken together represent the sender circuit of an automatic ticketing telephone step-by-step system as modified for automatic identification of calling parties in accordance with the invention.

Referring now in greater detail to Fig. 1 of the drawing we shall describe first the subscriber's novel station circuit which appears in the upper left-hand portion of this drawing in the box designated Subscriber Station "A." The subscriber's station here disclosed comprises a standard telephone station set, of the type now commonly employed in dial telephone systems, which is modified as shown by the addition of a vibrating reed relay-type selector having a tuned vibratory element V enclosed within primary and secondary coils as represented at P and S in the drawing, a fixed capacitor 5 being connected in parallel with the secondary winding S. The vibrating reed selector may be of the type disclosed by G. E. Perreault in Patent 2,502,339, issued March 28, 1950, or may be any other suitable type of narrow-band high Q magnetic vibrator having a normally open vibratile contact as illustrated at 6 in the drawing. With this type of selector in the subscriber's station circuit, when the receiver is off the hook and an alternating current of a particular predetermined frequency and sufficient amplitude passes through the primary winding P of the reed selector coil, the magnetic reed will be caused to vibrate at its tuned frequency and the vibrator contact 6 will be intermittently closed. Contact 6 in closing establishes a path from the ring side of the line R through the secondary winding S, through the reed vibrator and contact 6 thence through a switchhook make contact and line resistor 7 to ground. Condenser 5 and the secondary winding S of the reed selector comprise a phase shift circuit in which oscillations at the frequency of the tuned vibrator are maintained by energy supplied from the central office battery over the ring conductor R of the connecting line.

This arrangement of both primary and secondary coils around the reed selector enables the selector to serve a dual purpose as a receiver of a selected frequency signal, and a transmitter of a signal of corresponding frequency once the reed vibrator has been set in motion and is sustained in operation by direct-current energy from the central office. Once the vibrating reed selector has been energized by the alternating-current signal of correct frequency from the central office, the reed continues to vibrate through energization by the direct-current battery as interrupted by the vibrator contacts, even after the alternating-current signal is removed. The reed will continue to vibrate and interrupt the battery circuit at the reed frequency until such time as the central office battery supply is momentarily disconnected from the line. As will be more fully explained in reference to Fig. 4 of the drawing, these vibratory interruptions of the battery circuit at the subscriber's station can be detected at the central office and afford a reliable means for identifying the party on the line originating the call.

The line finders, selectors and connectors of the central office circuits are represented schematically in Fig. 1 of the drawing. For a detailed description of the structure and operation of such switches when used as selectors and connectors, reference may be had to Smith and Campbell "Automatic Telephony," Second edition, pages 53 to 65. For a description of the operation of a step-by-step line finder reference may be had to Patent 1,799,654, which issued to R. L. Stokely April 7, 1931. Detailed circuits of a complete ticketing trunk, trunk finder, sender and sender-trunk-connector, as required in an office equipped to render automatic ticketing service to two-party lines, are disclosed in Patent 2,447,533 which issued August 24, 1948 to J. B. Retallack. Details of a directory number identifier for an automatic ticketing system are disclosed by copending application of J. W. Gooderham, Serial No. 448,782, filed June 27, 1942, now Patent No. 2,629,016 granted February 17, 1953. The manner in which the directory number identifier and automatic ticketing sender are modified for ten-party identification in the preferred embodiment of the invention is disclosed in detail by Fig. 3 and Fig. 4 of the accompanying drawing.

In the preferred embodiment of the invention disclosed by the drawing provision is made for as many as ten parties on a common line. However, it is to be understood that the invention is not limited solely to ten-party lines but that the principles and mode of operation of the invention may be applied to lines having more or less than ten parties as may be desired. Since the embodiment of the drawing is adapted to ten-party lines, ten separate signal tone sources are provided in the central office as indicated by the box labeled "10 frequency tone source" which is connected to the party identification circuit of the sender shown schematically in Fig. 1. These multifrequency tones may come from vacuum tube oscillators, motor-driven tone wheels, or any other suitable frequency generating means. A preferred form of tone generator employs vibrating reed selectors, without vibrator contacts, connected in a balanced bridge network as disclosed by Patent 2,541,320, issued February 13, 1951 to A. E. Bachelet. Multifrequency means for selective ringing of party line stations on a manual basis are disclosed by Patent 2,532,125 which issued to Singer-Stacy on November 28, 1950.

The manner in which multifrequency selective ringing is achieved automatically, according to the invention, will now be described in reference to Fig. 1 of the drawing wherein are shown only the essential elements of a connector circuit as required to establish transmission between the calling and called subscribers.

To simplify the drawing of Fig. 1 a called subscriber's station is shown merely in block form as subscriber station "B." However, it is to be understood that, in the preferred embodiment, each subscriber station is equipped with a tuned reed selector as illustrated in detail by the circuit of station "A" in the drawing. The only distinction between stations on the same party line is that each has a differently tuned reed selector. Therefore, if the circuit of station "A" is substituted for the box of station "B" the detailed operation of ringing a called station may be clearly understood from the following description.

When the connector is seized by a calling party, relay 11 operates, in turn closing a circuit to operate relay 12 which is the off-normal relay of the connector circuit serving to hold the connector during the time it functions. After the calling subscriber has dialed the tens and units digits of the called station number into the connector, the pulsing circuit is switched from relay 11 to the rotary switch 15, which is known in telephone practice as the ringing code selector. This rotary selector 15 has an arc of ten positions, each of which is connected through a separate coupling transformer, such as $T_1$ and $T_{10}$, to a different one of the ten signaling frequency generators in the ten-frequency tone source. Also connected with each of the multifrequency coupling transformers $T_1$ through $T_{10}$, is a conventional 20-cycle ringing generator in series with a tripping battery $B_1$ as seen in Fig. 1. When the wiper of the selector switch 15 has been set to the ringing position on the ten-point arc, by the calling subscriber's dialed pulses, the connector sends out over the party line of the called station "B" a signal comprising the conventional 20-cycle ringing current having superimposed thereon a selected voice frequency which corresponds to the tuned reed frequency at the called subscriber's station. This signal is applied to all of the party stations on the common line, but only at the called station is the tuned reed selector energized, since this is the only station on the line having a reed selector tuned to the selected audio signal frequency.

By reference now to the detailed circuit of station "A" which, as explained above, may be substituted for the box of station "B," the operation of the reed selector at a called station may be understood. The ringing signal which comprises relatively high potential 20-cycle alternating current having superimposed thereon a lower potential selected audio frequency signal in series with a positively poled line battery is impressed across the ring and tip conductors R and T, of the called subscriber's line. The audio frequency component of this signal is applied to the high impedance primary of line transformer $T_{11}$ through blocking condenser $C_1$ which isolates the transformer $T_{11}$ from line battery and 20-cycle ringing current. The tip conductor of the line is connected to ground at the central office through a back contact and one winding of relay 14 as seen in the connector circuit of Fig. 1. The positive potential, with superimposed 20-cycle ringing signal, which is applied to the ring conductor of the line is connected through the called subscriber's ringer G to the main anode MA of the cold cathode gas tube GT. The secondary of line transformer $T_{11}$ is connected through the normally closed bottom contact of switchhook SH to the primary winding P of the called subscriber's reed selector, as shown by the detailed circuit of subscriber station "A" in Fig. 1.

The presence at primary winding P of this selected tone signal, which is of a frequency corresponding to the natural vibratory period of the called subscriber's tuned reed, causes the reed to vibrate and intermittently close vibratile contact 6. As contact 6 closes, the 20-cycle signal on the ring conductor of the line passes through the low impedance secondary winding S of the reed selector, thence through the reed vibrator, and contact 6, and through a normally closed contact of the switchhook to the control anode CA of gas tube GT. A current limiting resistor 8 is connected in series with the control anode. The positive potential thus applied to the control anode initiates discharge within gas tube GT, permitting current to flow between the cathode and main anode to operate the ringer G.

The manner in which party identification is accomplished according to the invention will now be described with reference to Fig. 1 of the drawing. When a party line subscriber lifts his handset preparatory to originating a call, the operation of his switchhook connects the calling subscriber's station with a selector at the central office which supplies dial tone in a well-known manner as disclosed in the prior art. The calling subscriber then dials the number of the called station in the usual manner. Subsequent to the dialing of the first digit into the selector, the sender is seized as described in detail by the aforesaid disclosures of Retallack and Gooderham.

The sender in the present invention, as will hereinafter be more fully described in reference to Fig. 3 and Fig. 4, comprises a ten-frequency tone source, all ten tones of which are applied simultaneously to the calling party line. One of these tones, corresponding to the tuning of the individual calling subscriber's reed selector, will energize the vibrating reed V at the calling party's station. During the time that the calling party's dial is off-normal, and when the dialing contact is closed, this multifrequency energy from the central office is applied to the primary coil P of the reed selector, energizing the vibratory reed selector and causing it to intermittently close its contact 6. Inasmuch as the primary coil P of the reed selector is in parallel with the telephone induction coil $T_{12}$ and transmitter during the time the dial is off-normal, and since this bridging of the talking circuit cannot be tolerated during conversation periods, the subscriber's station circuit is arranged as shown in Fig. 1 so that the talking circuit is only bridged during the time the dial is off-normal.

By reference now to the detailed circuit of subscriber's station "A" in Fig. 1 of the drawing the path of the multifrequency tones applied to the line by the sender may be traced. It will be seen that with the calling subscriber's receiver off-hook, one side of the reed selector primary winding P is connected through the dial off-normal contact (which is closed when the dial is operated), thence through the dial pulsing contacts, and through a now closed switchhook contact to the ring side of the line. The other side of primary winding P is connected to the tip side of the line. Thus the multiple tones applied to the line at the central office are impressed across the reed selector coil P at the calling party's station, and the one of these tones which corresponds in frequency to the natural vibratory period of the tuned reed causes the reed V to vibrate at its resonant frequency.

Once energized in this manner the reed is sustained in vibration by energy received from the signaling battery, $B_4$ in Fig. 3, which is connected to the ring side of the line at the central office. Referring again to the circuit of station "A" in Fig. 1, it will be seen that the ring side of the line is connected directly to the secondary winding S of the reed selector, thence through the reed vibrator V and vibratile contact 6, through the closed upper contact of switchhook SH, and through current limiting resistor 7 to ground. In this circuit the reed vibrator functions as an oscillator, with the secondary coil S inducing voltage back into the primary coil P, in the proper phase relation as determined by the combination of condenser 5 and the inductance of winding S, to sustain vibration of the reed V at its resonant frequency. The alternating signal voltage generated by this oscillator circuit is transmitted back to the central office via a circuit comprising the ring conductor and ground return. At the completion of the first digit dialed into the sender by the calling subscriber, the tones from the multifrequency generating source at the central office are disconnected from the line and the line is automatically switched to a detecting circuit in the sender as hereinafter described in greater detail in reference to the circuits of Fig. 2 and Fig. 3. As explained above, when the energizing tone signals are removed from the line, the calling station reed V continues to vibrate at its distinctive frequency, receiving its energy from the direct current supplied by the central office battery. The manner in which the frequency of battery circuit interruption is detected at the central office, to identify the calling party, will be described hereinafter in reference to Fig. 4 of the drawing.

Referring now to that portion of Fig. 1 and Fig. 2 of the drawing which shows the schematic diagram of the calling office switching facilities for number and class identification in an automatic ticketing system, the cooperating relation of these various elements will now be described in greater detail. At the central office the sleeve conductor associated with each subscriber's connector terminal, as seen in Fig. 1, is connected through a condenser resistance network C to a class coil of a common number and class frame within the directory number identifier as shown in Fig. 2 of the drawing. With this arrangement each party must have a different hundreds digit from all the other parties on his line. The tip parties should all be numbered in the same thousands group while the numbers assigned the ring parties must all be similarly limited to a common thousands group, although the thousands digits of the ring parties may be different from those of the tip parties. The purpose of this class circuit is to indicate to the directory number identifier that the calling subscriber station is equipped with a reed selector, and consequently the ticketing sender should indicate this fact to the identifier and also give the identifier the subscriber's hundreds digit registration, rather than for the directory number identifier to connect its detectors to the hundreds coils as it normally does in the case of calls originating from stations of other classes. It is this class identification in combination with the specific identifying tone signal from the calling party station which provides positive identification of the calling party.

The directory number identifier is seized when the sender operates the STT or the STR relay associated with the walking circuit shown schematically in Fig. 2, to indicate whether the calling subscriber's number is located in the tip field or the ring field, respectively. As soon as the directory number identifier is seized it operates a trunk connector shown schematically in Fig. 1, which connects the directory number tone source to the sleeve of the calling subscriber's line through the ticketing trunk circuit. This tone passes over the sleeve lead to the calling subscriber's connector terminal and thence through condenser resistance network RC to either the tip field or the ring field of the thousands number circuit. When the directory number identifier has been given a start signal in this manner, a walking circuit controlled by the STT and STR relays causes the vacuum tube detector circuits $VT_1$ through $VT_{10}$ to be connected to the thousands ring coil THR in Fig. 2 for the purpose of identifying the thousands digit of the calling subscriber. At the same time that the thousands digit identification is being made, the identifier is also making a test of the class coil in the manner described more fully by the aforesaid disclosure of J. W. Gooderham.

In the case of a call originating from the party station seen in detail at "A" in Fig. 1, a tone from the directory number tone source is detected in the class coil. This tone is applied by the directory number tone source through the identifier trunk connector to the sleeve of the line at the ticketing trunk, through the selector, through the network C to the class coil CL. The presence of this tone at the class coil informs the directory number identifier that the subscriber's station which is originating the call is equipped with a vibrating reed selector and that the hundreds digit identification will come from the sender. In this case operation of the class relay through the vacuum tube detector $VT_{12}$ causes transfer relay 100 in Fig. 2 to operate thereby connecting the hundreds relays $HU_1$ to $HU_{10}$ to the party relays $H_1$ to $H_{10}$ in the sender, as seen in Fig. 4. As soon as the thousands digit has been registered by operation of the thousands multicontact relay, the directory number identifier need not test the hundreds coils, as it normally would for lines not equipped with reed selectors, but the registration may now be taken directly from the $H_1$ to $H_{10}$ relays in the sender, as discussed in detail in reference to the circuit of Fig. 4 hereinafter.

Reference is now made to Fig. 3 and Fig. 4 of the drawing which represent in greater detail the sender circuit at the central office. That part of the circuit disclosed in Fig. 3 is substantially the same as the existing two-party flat rate test circuit now employed in automatic ticketing step-by-step telephone offices as disclosed by Gooderham and Retallack. The portion of the circuit illustrated by Fig. 4 discloses additions and modifications necessary for step-by-step sender circuits, as taught by the aforementioned Patent 2,447,533 to Retallack, for identification of from three to ten subscribers per line in accordance with the present invention.

Because of the fact that the sender has no means for determining the class of service of the line to which it is connected, it is necessary for the sender automatically to make a party test on all calls. In the interest of simplicity and economy of apparatus at the central office it may be considered desirable to retain substantially the same two-party flat rate test circuit as heretofore employed in two-party step-by-step switching systems. However, it is to be understood that the circuit may be adapted by those skilled in the art to employ the positive frequency identification test for all originating calls regardless of the class of service of the line to which the sender is connected. Therefore, the description of the sender circuit operation in reference to Fig. 3 and Fig. 4 will be divided into two parts describing, first, identification of a two-party flat rate line, and, secondly, identification on a ten-party line where subscriber stations are equipped with tuned reed selectors.

*Identification of a two-party flat rate line*

Generally, when a call comes into an automatic ticketing trunk it causes a trunk finder, which is connected to a sender, to hunt for that particular trunk. The trunk finder operates off-normal relays in the sender which in turn connect battery supply and ground to various other relays as needed. These connections to off-normal battery and ground supplies are shown in Fig. 3 of the drawing as dotted lines.

Referring now in greater detail to Fig. 3, when the sender is seized, off-normal ground from relay 300 operates relay 301 which in turn operates relay 302. Relay 302 operates relay 303 which in turn operates relay 304 which locks to off-normal ground through a back contact of the unoperated 305 relay.

When the trunk finder establishes connection between the trunk and the sender, relay 306 operates from a bridge in the trunk. Operation of relay 306 in turn operates relay 307 in series with relay 308, which in turn operates relay 301. The trunk now connects ground over the TC conductor to operate the polar relay 310 which indicates that a regular service connection is to be established. The relay 310, in operating, operates relay 311 which locks to off-normal ground. When the calling subscriber releases his dial to dial the first digit relay 306 releases, thereby releasing relay 307 which upon releasing operates the interdigital relay 312. Operation of relay 312 operates relay 300 which transfers the operating ground for the 301 relay from off-normal ground to a make contact of the interdigital relay 312. At the completion of the first digit relay 312 releases thereby releasing relays 301 and 302. With relays 301 and 302 released and relay 304 operated, the tip and ring conductors are connected together to varistor 315 in parallel with resistor 316, which may be of 5,000 ohms value, to the secondary winding of relay 317 which is connected to negative 110-volt battery $B_2$. This relay 317 is attached to the line for approximately $5/100$ of a second as controlled by the condenser timed relay 303 which releases in approximately $5/100$ second after relay 302 has released and removed ground from the secondary winding of relay 303.

During the interval that relay 317 is connected to the line the pulsing relay 306 is held operated over its primary winding by ground connection through the operated relay 304 and through the released relay 301. When relay 317 is connected to a two-party flat rate line, this relay will either operate or not at the end of the timed test period depending upon whether the originating subscriber is a tip or ring party. If the originating subscriber is a tip party of a two-party flat rate line, his station ringer winding, which has a resistance of approximately 3,640 ohms, will be connected between the tip side of the line and ground. During the time that relay 317 is presented to the line it will operate due to this ringer connection to ground at the calling subscriber's station. When relay 303 releases, ground applied from relay 303 through relay 305 released, thence through operated relay 304 and the operated relay 317 will operate relay 318 which indicates that the calling party is a tip party.

On the other hand, if the call is being originated by a ring party there will be no ground at the subscriber's station and when relay 303 releases, at the end of the aforementioned test period, ground will be connected through a back contact of released relay 303, thence through the released relay 305 and through the operated relay 304 and the released relay 317 to operate relay 320 which indicates a call originating from a ring party.

Whenever either relay 318 or 320 operates, the tip and ring conductors of the line are transferred from the winding of relay 317 to a negative battery supply of 48 volts. In this case the varistor 315 presents a high impedance and allows the current to flow only through the parallel resistance 316 which in the preferred embodiment has a resistance of approximately 5,000 ohms. This arrangement prevents bell tapping at the subscriber's station when the loop conductors are switched from 110-volt battery to 48-volt battery. With either relay 320 or 318 operated, relay 321 and relay 305 are both operated. Operation of either relay 320 or 318 also reoperates relay 303 through a back contact of the relay 321. However, when relay 321 operates, this back contact opens to release relay 303 approximately .015 second after it has been operated. In this instance relay 303 releases more quickly than heretofore because operation of relay 321 short-circuits resistor 323 which may have a value of approximately 1,900 ohms, thereby reducing the primary circuit resistance of the 303 relay winding. When relay 321 is operated by operation of either relay 320 or 318, the holding path for relay 304 is transferred from off-normal ground to a make contact of relay 303. When relay 303 releases a fraction of a second later, as described above, relay 304 also releases to reconnect the ring of the subscriber's line to the primary of the pulsing relay 306 and also to connect the tip of the line to off-normal ground so as to enable the subscriber to complete dialing.

Whenever relay 320 operates to indicate a ring party, relay 325 also operates over its primary winding from ground at relay 320 through a make contact of relay 321. Relay 325 locks to off-normal ground over its secondary winding. In operating, relay 325 connects ground to the STR lead of the identifier circuit, through a chain of back contacts on the $H_1$ through $H_{10}$ relays. In this situation, all of the H relays $H_1$ through $H_{10}$, will be released inasmuch as the station circuit of a two-party flat rate subscriber is not equipped with reed selectors. This chain of back contacts assures that all of the H relays are released before giving a start signal to the identifier circuit.

*Identification of more than two parties*

Referring now in greater detail to Fig. 4 of the drawing, taken in connection with the circuit of Fig. 3, we will trace the operation of party identification for party lines having from three to ten subscribers, each of whose station is equipped with a reed selector as seen at "A" in Fig. 1. When the sender is seized, the relay 400 and the relay 401 operate as auxiliary relays of the relay 311 and relay 302, respectively. Operation of relay 311 and relay 302 occurs in the same manner as discussed above in reference to party identification on a two-party flat rate line. At the start of dialing the first digit into the sender, relay 300 operates to connect positive potential of 130 volts from battery $B_3$ through a make contact of relay 400 to one of the contacts of all the reed selectors designated $F_1$ through $F_{10}$ in Fig. 4. This positive potential of 130 volts is also connected to the main anodes of all the cold cathode gas-discharge tubes $GT_1$ through $GT_{10}$, each of which is individually associated with corresponding reed selectors $F_1$ through $F_{10}$ as seen in Fig. 4 of the drawing. As mentioned above in reference to the operation of Fig. 1 of the drawing, when the sender is seized by a party originating a call, ten different frequency signals from the central office tone source are simultaneously applied to the calling party's line. As is seen in Fig. 4 of the drawing these ten frequency tones are transmitted to the calling subscriber line through an isolation amplifier and through make contacts of relay 401 and relay 400 to the ring conductor of the line. Since the tip side of the line is connected to ground by a make contact on relay 302 until completion of the dialing of the first digit, these ten tones are bridge-connected to the tip and ring conductors. The isolation amplifier shown in Fig. 4 prevents a trouble short in any one sender from shorting the tone supply source which is common to all senders. As discussed above in reference to Fig. 1 of the drawing, one tone of the multi-frequency signal causes the reed selector V in the calling subscriber station to vibrate and intermittently close its contact 6. This alternating-current energization of the calling subscriber's station reed continues until the completion of the dialing of the first digit.

After the first digit has been completely dialed into the sender, the tip and ring conductors are connected together and presented to the relay 318 in the same manner described above in reference to two-party flat rate service. At this time relay 401 releases and transfers the subscriber's loop from the multi-frequency generating source through a back contact of relay 402, thence through a band-pass amplifier to the coils of the reed selectors $F_1$ through $F_{10}$ at the central office as seen in Fig. 4 of the drawing. Since the vibrating reed V of the calling subscriber station is now interrupting the direct-current battery on the line at the natural frequency rate determined by the vibratory characteristics of the station reed, one of the detecting reed selectors $F_1$ through $F_{10}$, which is tuned to the same vibratory frequency as the station reed, will respond by vibrating and intermittently closing its contacts, which in turn causes its associated one of the gas discharge tubes $GT_1$ through $GT_{10}$ to ionize and conduct current through the winding of its associated H relay in the series $H_1$ through $H_{10}$, as seen in Fig. 4 of the drawing. Relays $H_1$ through $H_{10}$, inclusive, represent the hundreds digit of the calling subscriber. When a subscriber's loop is switched back to the pulsing condition, after relay 304 releases as described above, the detector relay 402 operates from ground at the released relay 303, thence through the operated 305 relay and the 400 relay operated.

The one of the H relays, $H_1$ to $H_{10}$, which is operated in response to the distinctive identifying signal transmitted from the calling party's station connects ground from the previously operated relay 325 through the tree contact arrangement of all the H relays, thence through a make contact on the operated H relay to either the STT or STR conductor leading to the identifier, depending upon whether the operated H relay is of an odd or even number. In the circuit of Fig. 4 the odd-numbered hundreds relays are connected to ground the STR lead and the even-numbered hundreds relays ground the STT lead. The tree contact circuit of all the H relays is arranged to give a trouble indication in the event that more than one H relay operates, a condition which might result from false signals or if two or more subscribers on the same party line should attempt to originate calls simultaneously. When the tree circuit determines that only one H relay is operated, the start signal is given to the identifier, provided that relay 325 of Fig. 3 is operated. Relay 325 will normally be operated whenever a line having party stations equipped with reed selectors is tested because the absence of ground at the calling station results in the operation of relay 325 rather than the relay 326 which, as was described above, operates only upon testing a two-party flat rate line.

It is to be understood that although the party test operations of the sender have been described separately for two-party, and more than two-party, lines to afford a clearer understanding of the circuit operation in either case, in actual practice of the invention both tests are automatically applied simultaneously to any incoming line on which a call is originated.

It will be obvious to those skilled in the art of telephony that many variations of central office circuits may be made within the scape of the invention. For example, an alternative arrangement can be used to give calling office number and class identification. One alternative consists of adding an additional field for each subscriber on a party line having more than two stations. This alternative imposes fewer restrictions on the numbering plan inasmuch as each party of a party line might then have a different thousands digit. The additional fields, however, are rather costly and this factor must be considered in comparison with the cost of administering a restricted numbering plan in determining which arrangement may be preferable for any given office.

Also, it will be obvious that the subscribers' stations on only two-party lines, and even stations on private lines, may be equipped with reed selectors for positive identification in the same manner that ten-party identification is disclosed herein, and that the central office circuits may thereby be simplified by eliminating the facilities for tip and ring flat party identification. However, the cost of equipping all subscribers' stations with tuned reed selectors may be weighed against the cots of providing a plurality of identifying test circuits in the central office. Whatever may be considered the preferred alternative in any given office will be determined by such economic considerations. Therefore, the invention is not to be limited to the particular preferred embodiment herein disclosed.

What is claimed is:

1. A signaling system comprising a central office and a plurality of individual stations transmissively connected therewith, said stations adapted to originate and receive signals, selective control means at each of said stations responsive to a received signal of distinctive characteristics peculiar to the station at which it is located for completing a signaling circuit thereat, means at said central office for transmitting the signal of distinctive characteristic peculiar to any station to be signaled, means at each of said stations for signaling said central office, further means in said central office responsive to a signal from any one of said stations to energize the said control means thereat whereby said control means at said one of said stations will transmit a station identifying signal of distinctive characteristics from said one of said stations to said office, means at said office for receiving said transmitted identifying signal from said one of said stations and further means in said office for identifying said one of said stations by said identifying signal.

2. A telephone switching system comprising a central office, a plurality of subscribers' stations connected to a line of said office, said stations adapted to originate and receive calls, frequency selective signal control means at each of said stations operable to close a local ringing circuit thereat upon receiving a calling signal of predetermined frequency individually distinctive to said station, means at said office for selectively applying to said line a calling signal of distinctive frequency characteristics individual to each of said stations to be called, calling means at each of said stations for applying to said line a calling signal to said central office, further means at said central office responsive to a calling signal on said line from any of said stations for applying to said line all the calling signals of distinctive frequency characteristic individual to all said stations on said line, said control means at each station being controlled by said calling means in said station operable upon originating calls from said station to said central office and responsive to said simultaneously applied calling signals on said line from said further means in said central office to transmit over said line a station identifying signal of the distinctive frequency characteristic individual to said station to said office, and means at said office for registering the identifying signal received over said line from any station originating a call.

3. A telephone switching system comprising a central office, a plurality of subscribers' stations connected to a party line of said office, said stations adapted to originate and receive calls, a selective signaling control means at each of said stations responsive to a calling signal of distinctive characteristics for each station, said control means at each of said stations operable to close a ringing circuit thereat in response to a calling signal of characteristic distinctive to said station, means at said office including said line for transmitting a calling signal of selected distinctive characteristics to any station to be called, means including said line at each of said stations for calling said central office, further means in said central office responsive to a call from any of said stations to set into operation said control means at said calling station to transmit a station identifying signal of distinctive characteristic from said calling station to said office, and means at said office for registering the identifying signal from any calling station.

4. In a telephone switching system, a central office, a plurality of subscribers' stations connected to a party line of said office, said stations adapted to originate and receive calls, a tuned reed device at each of said stations operable to close a ringing circuit thereat when energized by signaling currents from said office which have a distinctive frequency peculiar to the station at which each is located, means at said office for selectively transmitting signaling currents of distinctive frequencies over said line to energize said tuned reed device at any of said stations to be called, calling means at each of said stations for transmitting a calling signal over said line to said office, further means in said office responsive to a calling signal from any one of said stations for simultaneously transmitting over said line to said one of said stations signaling currents of plurality of frequencies said tuned reed device at each station being controlled by said calling means operable upon origination of a call thereat and responsive to signal currents of said plurality of frequencies transmitted over said line from said further means in said office to generate locally an identifying signal of frequency characteristics distinctive to said station, means including said party line for transmitting said locally generated identifying signal to said office, and means at said office responsive to the reception of said identifying signal thereat for identifying said calling party station.

5. In a telephone switching system, a central office comprising a plural frequency signal generating means, a plurality of outlying stations connected with said office by means of a party line, said stations adapted to originate and receive calls, a vibrating reed at each of said stations tuned to vibrate at one of the frequencies of said plural frequency generating means, each of said station reeds tuned to vibrate at a different one of said frequencies from the frequencies to which all the other stations of said party line are tuned, said reed at each station operable to close a local ringing circuit thereat when energized by a signal over said line from said office of corresponding frequency, selective means at said office for transmitting signal current of required frequency over said line to call a selected one of said stations, calling means at each of said stations for calling said office over said line, further means at said office operable in response to an originating call from any of said stations to transmit current of all said frequencies over said line whereby the reed at the station originating said call is caused to vibrate, means at said station originating said call cooperating with said vibrating reed thereat for generating an individual signal of frequency corresponding to the tuning of said reed, means at each of said stations for transmitting said generated individual signal over said line to said office and means at said office responsive to the reception of said individual signal thereat for identifying said calling station.

6. In a telephone switching system, a central office comprising multifrequency signal generating means and a battery, a plurality of outlying stations connected with said office by means of metallic lines, certain of said outlying stations being party stations on a common party line, said stations adapted to originate and receive calls, a tuned reed relay at each of said party stations, each of said relays at said party stations on a common party line tuned to a different frequency of said central office generating means, said tuned relays at each said party station operable to complete a ringing circuit thereat in response to a ringing signal from said office comprising energy of the frequency to which said relay is tuned, switching means at said office for transmitting signal current of required frequency over any of said lines to signal the outlying station to be called, calling means at each station for originating a call to said central office over one of said lines, said calling means at each of said party stations including switchhook contacts for connecting the tuned reed relay thereat to the party line thereof upon origination of a call therefrom, means at said office responsive to the origination of a call from any of said party stations for connecting said multifrequency signal generating means to said party line to transmit current of all of said frequencies over said party line to said party stations whereby the reed relay at the call originating party station is caused to vibrate, switching means at said office for disconnecting said multifrequency signal generating means from said party line after a measured time interval and for connecting said battery to said party line, means at said call originating party station including a vibrator contact of the reed relay thereat responsive to direct current over said party line from said battery for sustaining the vibration of said relay at its tuned frequency and for interrupting said direct current at a distinctive frequency controlled by vibration of said reed relay, means at said call originating party station including said party line for transmitting the interrupted direct current of distinctive frequency to said office and further means at said office responsive to said interrupted direct current of distinctive frequency for identifying said call originating party station.

7. In a telephone system, a central office, a line extending therefrom, a plurality of subscribers' stations upon said line, a vibratory element at each said station transmissively connected to said line each such element being of periodicity different from the others, means for selectively calling said stations from the said central office including means for sending from the central office currents having a variable component of frequency selectively to vibrate one of said elements, means controlled by said one selected element to establish a called condition at its respective station, means at each said station operable when the line is idle to establish a calling condition at the central office, means at said central office operable incident to the establishing of said calling condition to vibrate the element of the calling station, means controlled by said vibration of the element of said calling station to impress upon the line a current having frequency variations corresponding to the periodicity of said element, and selective receiving means at the central office responsive to said current variations to distinctively identify the said calling station.

References Cited in the file of this patent

UNITED STATES PATENTS

| | | |
|---|---|---|
| 2,410,520 | Ostline | Nov. 5, 1946 |
| 2,542,592 | Styren | Feb. 20, 1951 |
| 2,547,024 | Noble | Apr. 3, 1951 |
| 2,562,594 | Bielenberg | July 31, 1951 |
| 2,581,056 | Walmsley | Jan. 1, 1952 |
| 2,599,097 | Entz et al. | June 3, 1952 |